US008879280B2

(12) United States Patent
Lim et al.

(10) Patent No.: US 8,879,280 B2
(45) Date of Patent: Nov. 4, 2014

(54) TECHNIQUES TO REDUCE AUDIBLE NOISE IN A POWER SUPPLY TRANSFORMER

(75) Inventors: Kok Kee Lim, Singapore (SG); Yong Siang Teo, Singapore (SG); Siew Teng Winson Wong, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 654 days.

(21) Appl. No.: 12/338,352

(22) Filed: Dec. 18, 2008

(65) Prior Publication Data

US 2010/0157631 A1 Jun. 24, 2010

(51) Int. Cl.
*H02M 3/335* (2006.01)
*H02M 1/44* (2007.01)

(52) U.S. Cl.
CPC ............ *H02M 3/33507* (2013.01); *H02M 1/44* (2013.01)
USPC .................. 363/21.03; 363/20; 363/21.02

(58) Field of Classification Search
USPC ............. 363/21.01–21.05, 21.07, 21.08, 363/21.1–21.13, 21.15, 21.16, 21.18, 39–43
See application file for complete search history.

(56) References Cited

U.S. PATENT DOCUMENTS

| | | | | |
|---|---|---|---|---|
| 4,984,145 | A | * | 1/1991 | Dangschat et al. ............. 363/19 |
| 5,072,353 | A | * | 12/1991 | Feldtkeller ....................... 363/20 |
| 5,892,672 | A | * | 4/1999 | Preller ............................. 363/97 |
| 6,545,881 | B2 | | 4/2003 | Preller |
| 6,744,649 | B1 | * | 6/2004 | Yang et al. ....................... 363/98 |
| 2002/0105815 | A1 | * | 8/2002 | Preller ............................. 363/16 |
| 2002/0131283 | A1 | * | 9/2002 | Preller ............................. 363/97 |
| 2005/0149151 | A1 | * | 7/2005 | Orszulak et al. ................ 607/96 |
| 2006/0044845 | A1 | * | 3/2006 | Fahlenkamp et al. ....... 363/21.15 |
| 2008/0019161 | A1 | * | 1/2008 | Lee et al. ......................... 363/89 |

OTHER PUBLICATIONS

Infineon technologies, Controller for Switch MOde Power Supplies Supporting Low Power Standby and Power Factor, Data Sheet, Version 1.3, Jul. 2003.*

"Controller for Switch Mode Power Supplies Supporting Low Power Standby and Power Factor", Infineon Technologies, Power Management and Supply, Datasheet, V2.0, Jul. 31, 2003, PWM-QR IC, TDA 16846/16846-2, TDA 16847/16847-2, 30 pgs.

* cited by examiner

*Primary Examiner* — Matthew Nguyen
*Assistant Examiner* — Gustavo Rosario Benitez
(74) *Attorney, Agent, or Firm* — SpryIP, LLC (57) ABSTRACT

This disclosure relates to a switching power supply with regulated voltage suppression to reduce transformer audio noise. A switched mode power supply (SMPS) may supply power at different levels according to output loads. A switching frequency of the SMPS may be adjusted according to the output load. The switching may be subject to a ringing suppression time, a maximum on time, and a maximum switching period. By controlling the switching frequency subject to these quantities, the audible noise of an SMPS may be reduced or eliminated.

18 Claims, 7 Drawing Sheets

FIG. 1A

(PRIOR ART)

TECHNIQUES TO REDUCE AUDIBLE NOISE IN A POWER SUPPLY TRANSFORMER

BACKGROUND

This application relates to switchable power supplies and, more particularly, to reducing audible noise in power supply transformers resulting from switching power supplies switching in the audible frequency range.

Generally, a typical Quasi Resonant Flyback converter, e.g. converter 100 (FIG. 1A), includes a Quasi resonant pulse width Modulator controller 101 coupled to a transformer 102. Transformer 102 transfers energy directly between its input and output in a single step. Transformer 102 may be used in converting an input alternating current (AC) voltage (Vin) to an isolated output voltage (Vo). The Quasi Resonant Flyback converter 100 also includes a Power MOSFET 104 operating as a switch.

Figure 1A:
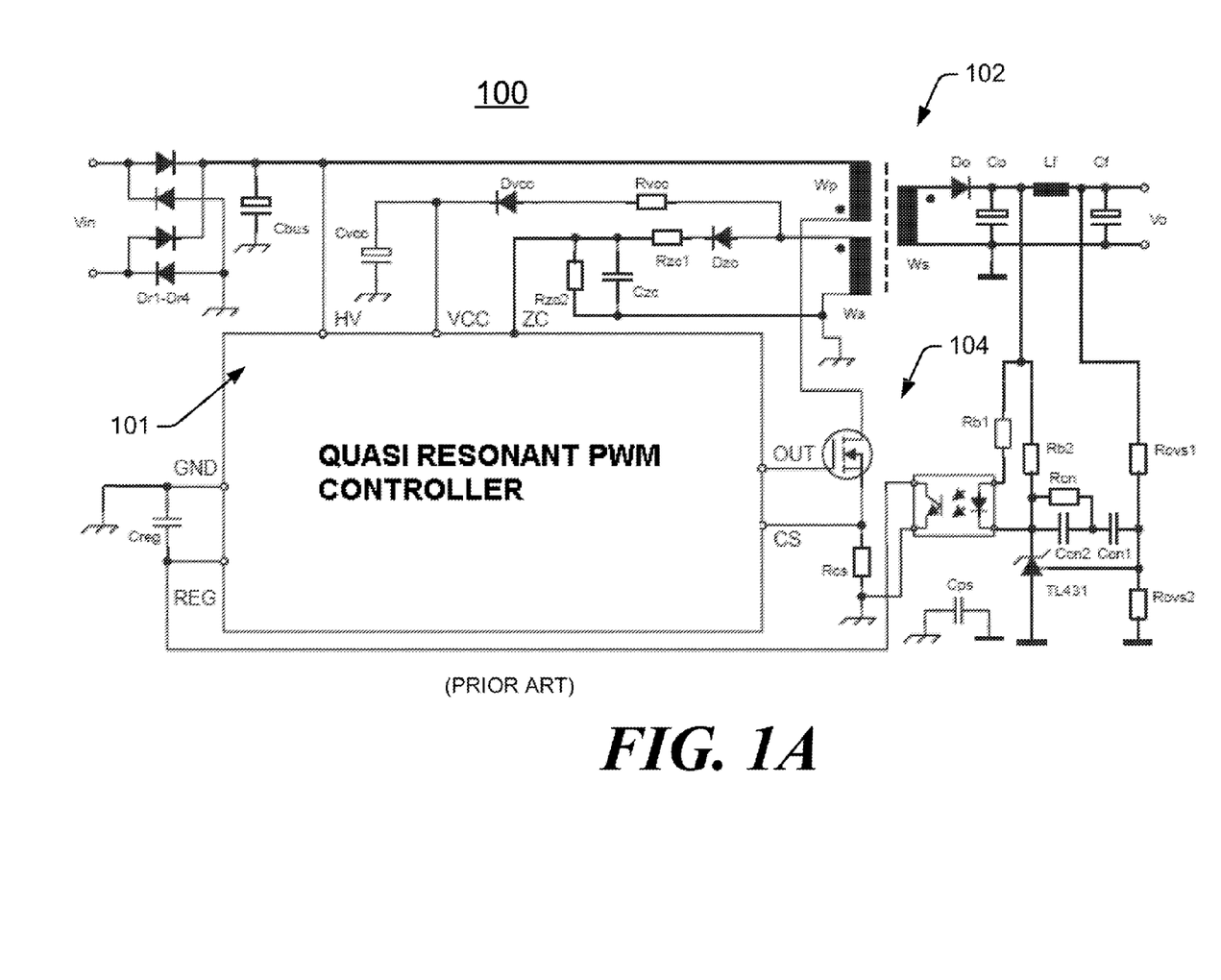
FIG. 1A is a schematic diagram of a Quasi Resonant Flyback converter 100.

The frequency of a gate signal turning on and off the Power MOSFET is reduced with output load to reduce switching losses. This reduction in frequency is achieved by turning on the Power MOSFET at increasing number of valleys of the drain-source voltage through the sensing of zero-crossing voltage at ZC pin. The zero crossing voltage signal is derived from the output voltage of an auxiliary winding (indicated by signal designation "Wa" in FIG. 1) in Quasi Resonant Flyback converter 100 in the power supply. In order to ensure correct zero crossing monitoring, during a period of time starting from the instant the gate of transistor 104 is turned off, converter 100 is normally prevented from detecting any zero crossing voltages to reject any ringing at a zero crossing pin of transistor 104. However due to tolerances, the actual timing may fluctuate and an unwanted disturbance to the system may result.

For example, audio noise is generated in the transformer 102 when there is a low frequency Jittering due to variations in untrimmed ringing suppression times, maximum on and off time and maximum switching periods. Any switching frequency lower than 20 KHz, e.g. a switching period which is greater than 50 µs, would induce audible noise. The audible noise that due to the maximum switching period is not limited or, not accurate even it's being limited.

Another issue is that if the ringing suppression time, maximum on and off time and maximum switching period change in different directions, thereby affecting the input power. For example, if the ringing suppression time becomes larger while the maximum switching period becomes smaller, a maximum duty cycle will be reduced. As a result, the system might not be able to meet its output load requirements.

Although these timing may be trimmed, these inaccuracies of the ringing suppression time, maximum on and off time and maximum switching period can result in gate switching in the audible frequency range. If the timing is to be trimmed individually, this will require a large die area for converter 100 which is undesirable.

Certain known techniques include using an analog mode control to suppress untrimmed ringing times. The suppression time is generated by a comparator and a capacitor charging block with two charging current path options. The comparator compares the zero crossing voltage to a threshold voltage. If the zero crossing voltage is greater than the threshold voltage, a higher charging current path is chosen to charge the capacitor. Hence the ringing suppression time is small when the zero crossing voltage is high. If the zero crossing voltage is less than the threshold voltage, a smaller charging current path may be chosen to charge the capacitor. Hence the ringing suppression time is large when the zero crossing voltage is low.

Figure 1B:
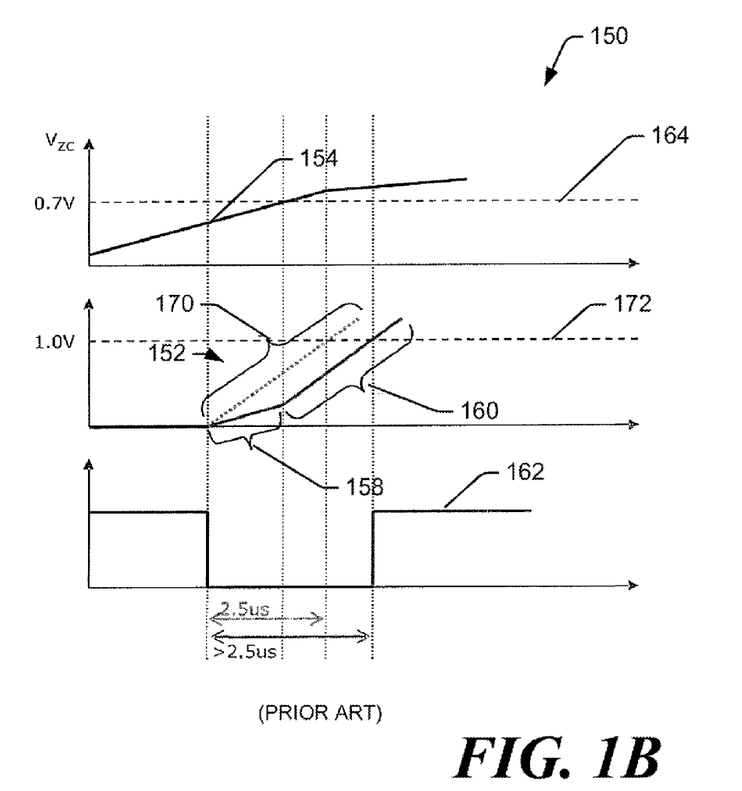
FIG. 1B is a timing diagram for a voltage control circuit according to known techniques that sets the switching frequency for a switching power supply.

One drawback of known methods is illustrated in FIG. 1B. In FIG. 1B there is shown a timing diagram 150 that illustrates a slope 152 of the voltage of a capacitor (not shown) that is used to set the ringing suppression time for the switching power supply. Timing diagram 150 illustrates zero crossing voltage 154, the voltage 158 and 160 of the charging capacitor and the gate signal 162. The slope 152 is determined using the charging current and capacitor as mentioned before. When the zero crossing voltage 154 is less than a threshold value 164, e.g. 0.7 V, the capacitor is charged by smaller current in order to achieve a longer ringing suppression time (e.g. Slope 158), however, when the zero crossing voltage crosses over the threshold, the slope will be changed as a larger charging current path is selected in order to achieve a smaller ringing suppression time (e.g., Slope 160). Ideally, the ringing suppression time would be the time that the voltage of line 170 is less than a predetermined voltage 172, e.g. 2.0 V. However with using current known techniques, the ringing suppression time will be longer than required, which may result in a longer ringing suppression time that could affect the feedback loop in the whole system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Disclosed herein are techniques for regulating a switched mode power supply. A switched mode power supply is provided that has a transistor (Power MOSFET) operating as a switch and a driving circuit. The switched mode power supply supplies a relatively higher output power at times and a relatively lower output power at other times. As an output load of the power supply decreases, a switching frequency is briefly lowered to reduce switching losses. As the output load increases, the switching frequency is briefly raised.

The switching frequency of the transistor switch is lowered to reduce output power. When the transistor switch is switched off, there is a first predetermined time period the transistor switch is suppressed from turning on. If the output voltage rises and during a switch-off interval of the transistor switch, there is a second predetermined time period the transistor switch is suppressed from turning on.

In one implementation, a ringing suppression control to reduce transformer audio noise is provided in a mixed signal mode of a switch mode power supply. A pulse circuit generates digital pulses with fixed period, and a coupled comparator makes an accurate selection of ringing suppression time. In other words, the ringing suppression time circuit is converted to digital mode and then, by making use of the digital output, an accurately synchronized maximum on time and maximum switching period is generated by using just two counters. As a result of this implementation, accuracy of ringing suppression is increased and the transformer's audible noise is eliminated. Furthermore, this implementation reduces the circuitry necessary to construct a device to suppress ringing.

In another described implementation, a system is shown that includes a switching power supply and a circuit. The switching power supply receives a zero crossing voltage and an output voltage. The output power is dependent on the frequency and duty cycle of gate voltage signal applied to the transistor switch. The frequency and duty cycle of the gate signal is dependent on the peak primary current, the feedback voltage and the zero crossing valley counts. The circuit sets ringing suppression time of the drain-source voltage of the switch when the switch is turned off. The ringing suppression time is only active once for each cycle period of a switch/gate and the turn off of the switch/gate depending on the zero crossing voltage. When the zero crossing voltage is below a predetermined voltage threshold, the ringing suppression time is set to a longer time period. When the zero crossing voltage is above the predetermined threshold voltage the ringing suppression time is set to another shorter time period.

According to another implementation, a switch mode power supply device that includes a transformer is provided. The device includes at least one transistor switch and a drive circuit. The switched mode power supply is operable to supply a relatively higher output power via the transformer at times and a relatively lower output power via the transformer at other times. The drive circuit lowers a switching frequency being fed to the transformer to reduce switching losses as an output load decreases. The drive circuit temporarily lowers the switching frequency upon an occurrence of the lower output power, and during a switch off interval of the transistor switch, suppressing the detection of zero crossing for a predetermined time period.

Using a digital circuit for controlling the ringing suppression time results in a more accurate ringing suppression time. Thus the digital circuit prevents the problems described in connection with FIG. 1. Also, since the ringing suppression time is generated using a digital circuit, timings accuracy is improved resulting in a more accurate maximum on time and switching period thereby avoiding switching in the frequencies that generate audible noise.

The techniques described herein may be implemented in a number of ways. One example environment and context is provided below with reference to the included figures and ongoing discussion.

Exemplary Systems and Operation

Figure 2:
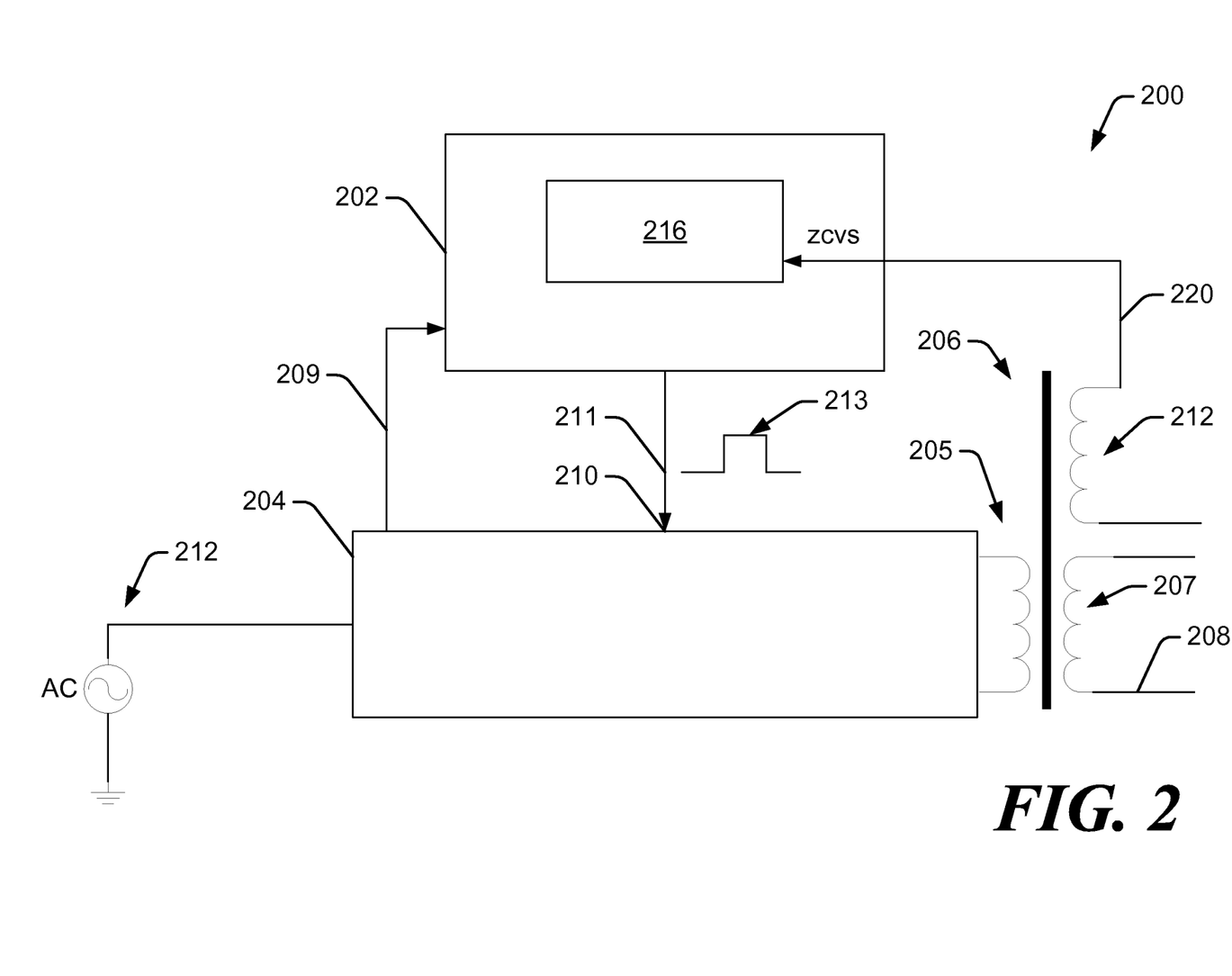
FIG. 2 is a simplified block diagram of a switching power supply with ringing suppression to reduce transformer audio noise.

FIG. 2 illustrates a simplified schematic diagram of a switching power supply 200. Switching power supply 200 includes circuit 202, and drive circuit 204 coupled via output transformer 206 to output terminal 208. Drive circuit 204 has an input terminal 210 that receives a pulse width modulated gate signal 213 on line 211 from circuit 202. The modulation of the gate signal is dependent on the current sense signal, feedback voltage and the zero crossing count. Power is supplied to switch circuit 202 on line 209 from drive circuit 204.

Drive circuit 204 receives an input supply voltage from power source 212, which is switched by the modulated gate signal 213 fed from switch circuit 202 to input terminal 210. Modulated gate signal 213 drives a gate or switch (not shown) in drive circuit 204. The output of drive circuit 204 is fed through transformer 206 to output terminal 208. The output voltage on output terminal 208 is set using the modulated gate signal 213. Circuit 202 includes a circuit 216 (shown in more detail in FIG. 3) to set a ringing suppression time (also referred to as a settling time) of the modulated gate signal 213, a maximum on time of the modulated gate signal and a maximum switching period of the modulated gate signal.

The voltage in the primary winding 205 of the transformer 206 is reflected onto the auxiliary winding 212 and the secondary winding 207 of the transformer 206. The output of the auxiliary winding 212 is also fed on line 220 to circuit 202 and circuit 216. When the zero crossing (zcvs) voltage level on line 220 is below a predetermined voltage threshold level and the transistor switch is turned off, the ringing suppression time for the gate driven by regulated gate signal 213 is set to a longer (first) period. The zcvs voltage level is derived from and may be proportional to the output voltage fed to transformer 206. When the zcvs voltage level is above the predetermined threshold voltage level and the transistor switch is turned off, the ringing suppression time for the gate driven by modulated gate signal 213 is set to another (second) time interval shorter than the first time interval. The voltage level at output terminal 208 and line 220 will vary as a function of a load on output terminal 208. In one implementation, the drive circuit 204 is operable to lower the switching frequency of modulated gate signal 213 to reduce switching losses as an output load decreases. Further details of a circuit for generating the ringing suppression time is described in connection with FIG. 3.

Figure 3:
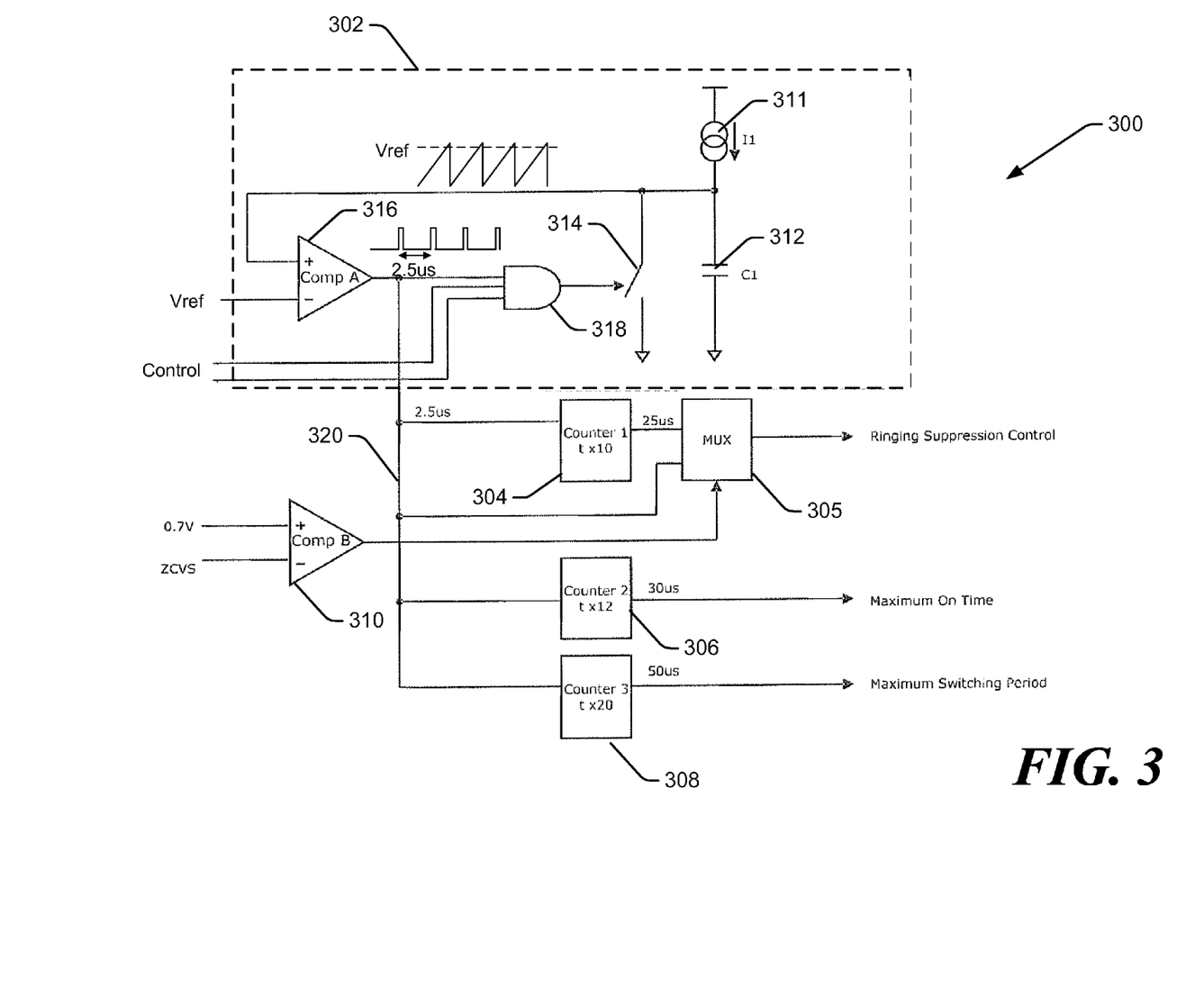
FIG. 3 is a schematic diagram of a circuit shown in FIG. 2 for generating a ringing suppression control signal, maximum on time signal and maximum switching period signals to reduce transformer audio noise.

FIG. 3 shows a simple block diagram illustrating selected modules in circuit 300 (referred to as circuit 216 in FIG. 2) in transistor switch circuit 202 (See FIG. 2). Circuit 300 includes a pulse generation circuit 302 coupled to counter 304, multiplexer 305, maximum on time counter 306 and maximum switching period counter 308. Counter 304 is only active when the zcvs is below the predetermined threshold value and the gate is turned off. Counter 306 is only active when the gate is turned on. The output of ringing suppression counter 304 is also connected to multiplexer 305. Comparator 310 receives the zero crossing voltage signals on one input and receives a preset voltage level, e.g. 0.7V, on its other input. The output of comparator 310 is connected to multiplexer 305 to select as the ringing suppression control signal. Either the output of counter 304 or the output of pulse generation circuit is selected as the ringing suppression control signal. The output of counter 304 is selected by multiplexer 305 as the ringing suppression control signal when the (zcvs) voltage level drops to below the predetermined threshold level, and selects the output of circuit 302 as the ringing suppression control signal when the (zcvs) voltage level rises to exceed the predetermined threshold level.

Circuit 302 is a pulse generator. Circuit 302 includes comparator 316 that generates a pulse, which is fed to counters 304-308 and multiplexer 305. Circuit 302 includes a current source 311 connected to a capacitor 312, shunting switch 314, and comparator 316. In one implementation the capacitance of capacitor 312 matches the capacitance at an internal oscillator of circuit 202 so that indirect trimming can be performed. For example, an oscillator in the circuit 202 will be trimmed. When the oscillator is trimmed, the matched circuit gets indirectly trimmed resulting in an indirectly trimmed (accurate) timing of the circuit.

The output of comparator 316 is fed to AND gate 318. Control signals from circuit 202 may be fed to other inputs of gate 318 to enable and disable gate 318.

As the voltage at capacitor 312 increases, the level of the voltage on the input of comparator 316 rises. When the voltage level exceeds the level of $V_{ref}$, comparator 316 triggers, resulting in a logic HIGH on line 320. If a control signal being fed to AND gate 318 is also a logic HIGH, then output of AND gate 318 is also a logic HIGH to trigger switch 314 on. If a control signal being fed to gate 318 is a logic LOW, switch 314 is turned off to stop the pulse generation. Triggering switch 314 shunts the voltage level on the input to comparator 316 to ground and a pulse being generated on line 320. In one implementation, comparator 316 generates multiple pulses at 2.5 microsecond intervals on line 320.

Counters 304-308 provide an indication of when a predetermined number of pulses occur; thereby creating synchronized timers to indicate a predetermined time period has elapsed. In one implementation, counter 304 generates multiple pulses at 25 microsecond intervals indicating a 25 microsecond duration has occurred, counter 306 provides multiple pulses at 30 microsecond intervals indicating 30 microseconds has occurred, and counter 308 provides multiple pulses at 50 microsecond intervals indicating 50 microseconds has occurred. The output of maximum on time counter 306 is used to set the maximum on time of gate signal 213. The output of maximum switching period counter 308 sets the maximum switching period of a gate signal 213. The ringing suppression control signal prevents the transistor switch being switched on just right after it being turned off which in a way caused by the oscillation 1 in FIG. 5 to reduce audio noise. The maximum on time signal and the maximum switching period signal are fed to circuit 216 to set limits of the switching periods of gate signal, i.e. the maximum on and maximum switching period. Techniques for setting the gate signal are know and are not disclosed herein.

Although circuit 300 is shown using transistor-transistor logic and comparators, this implementation is meant to serve only as non-limiting examples and may include other logic types and circuitry, including, but not limited to, CMOS, LVCMOS, GTL, BTL, ETL, or BiCMOS.

Figure 4:
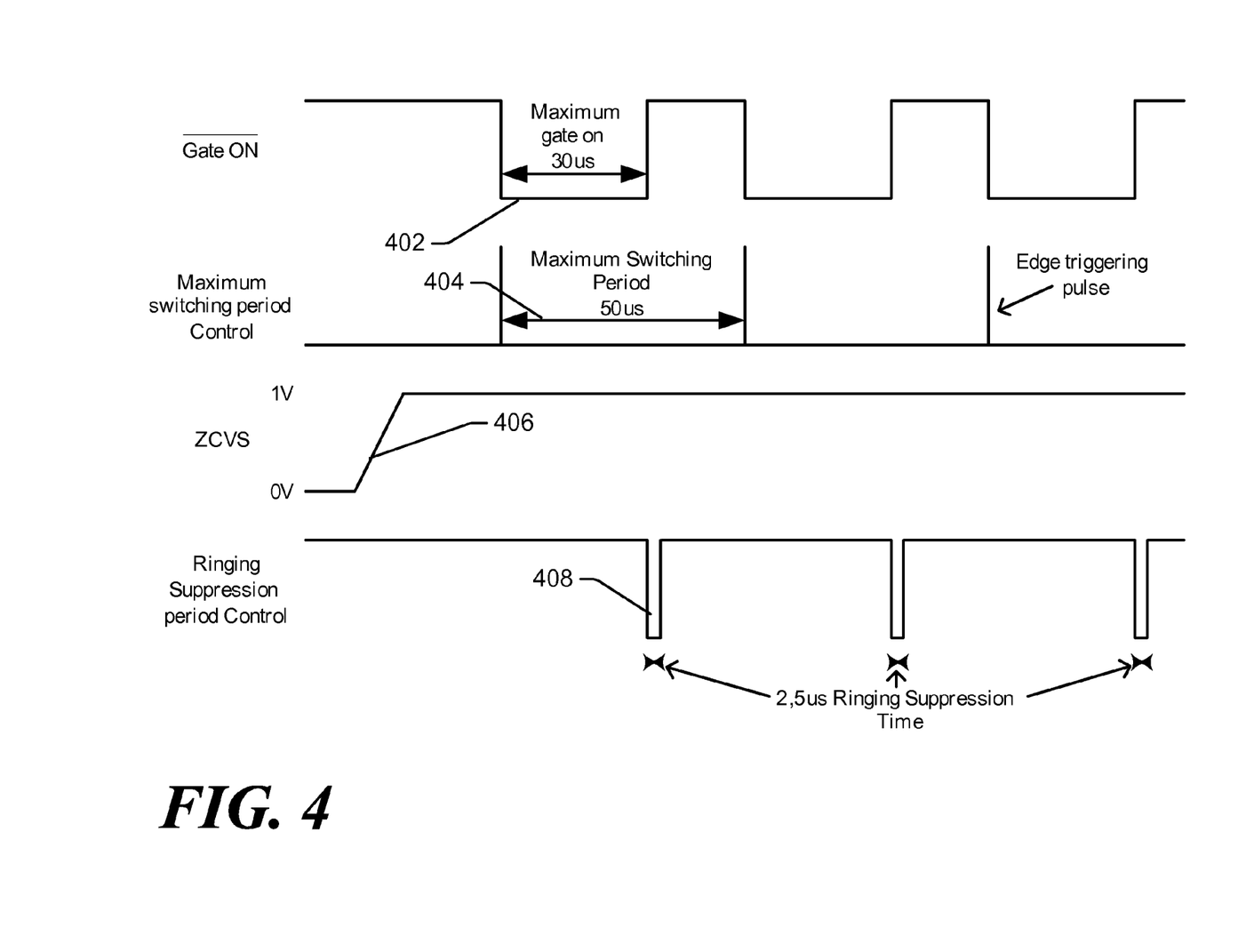
FIG. 4 is a timing diagram of the maximum on time signal, the maximum switching period signal, the zero crossing voltage signal and a ringing suppression time signal.

FIG. 4 includes exemplary timing diagrams 402-408 corresponding to the an inverted "Gate_On" signal, the output of counter 308, the zero crossing voltage (zcvs) input to comparator 310 and the output from multiplexer 305 respectively. The "Gate-On" signal is determined by the "AND" function of a control signal from the ringing suppression circuitry such that during the ringing suppression period, gate cannot be switched ON. Diagram 402 shows a timing diagram of the "maximum on time". Diagram 404 shows a timing diagram of the maximum switching period. Diagram 406 shows a timing diagram of the zero crossing voltage level, and diagram 408 shows a timing diagram of the ringing suppression interval.

Figure 5:
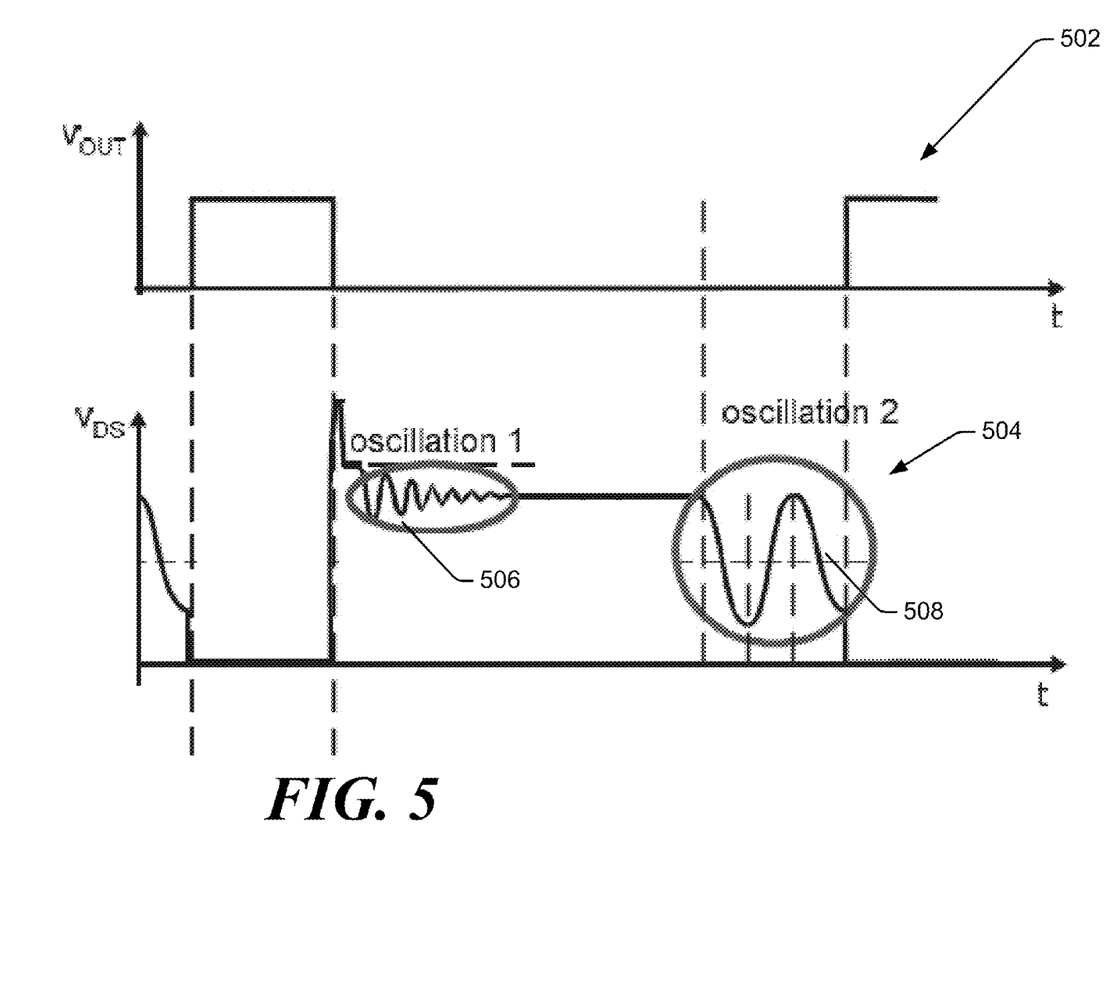
FIG. 5 is a timing diagram of the output signal ($V_{out}$) from the switch circuit and the output signal ($V_{DS}$) from the drive circuit shown in FIG. 2.

FIG. 5 illustrates an exemplary timing diagram of the output signal ($V_{out}$) from switch circuit 202 and the output signal 504 from drive circuit ($V_{DS}$), which is supplied as the (zcvs) voltage input to comparator 310. When the transistor switch is turned off, there will be some oscillation on $V_{DS}$. This oscillation will also appear on the $V_{zc}$ input to comparator 310. To avoid the comparator 310 being turned on and being mistriggered by such oscillation, ring suppression is implemented to "block" the SET of the gate, or to avoid the gate signal being switched on due to oscillation 1 506. Oscillation 1 is the oscillation that is being suppressed. Oscillation 2 is used for detecting the zero crossing voltage. The time of the ring suppression is dependent on the voltage $V_{zc}$. When the voltage $V_{zc}$ is lower than the threshold voltage for comparator 310, a longer preset suppression time is applied, while a shorter time is applied when the voltage $V_{zc}$ is higher than the threshold voltage.

Exemplary Process

Exemplary methods are described below that implement an adaptation algorithm to reduce collisions. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable media. The computer-readable media can be any available media that can be accessed by a computing device to implement the instructions stored thereon.

Figure 6:
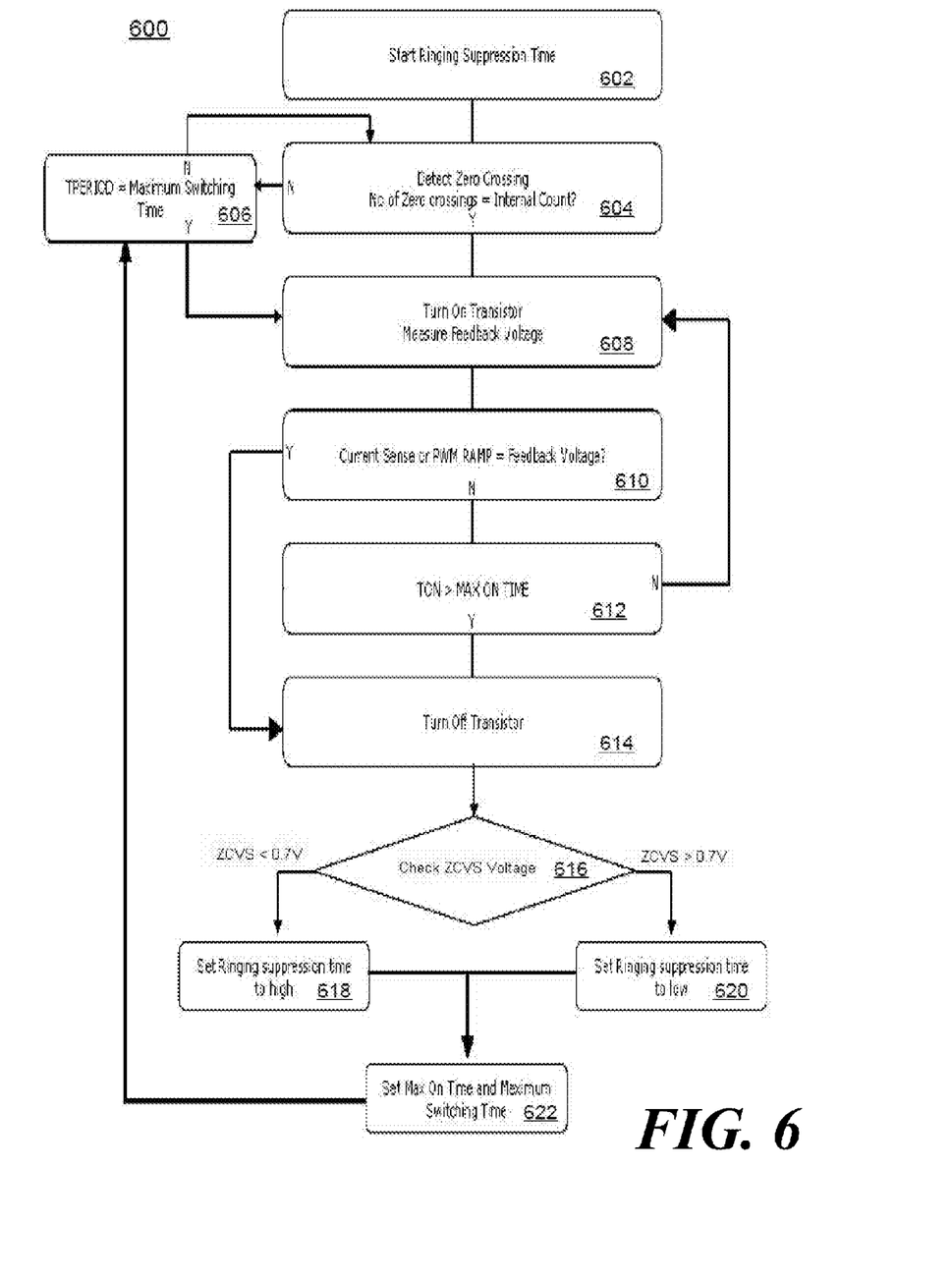
FIG. 6 is a flowchart of a process for reducing the ring time generated at the output of the switch mode power supply shown in FIG. 2.

FIG. 6 shows one example implementation of a process 600 for reducing audio noise in a switched mode power supply by limiting switching periods and maximum on time of the gate signal. The drive circuit 204 in switched mode power supply 200 shown in FIG. 2 has at least one transistor switch with a gate voltage. In one implementation, the gate voltage of the transistor switch is turned on after the ringing suppression time interval, when the number of the zero crossing count (the number of times that the zero crossing voltage (ZCVS) crosses a certain voltage threshold) is equal to the internal count, or the gate voltage of the transistor switch is turned off when the transistor switch is turned on for too long. Likewise, if the switching period is too long, the gate voltage will be turned on.

In block 602, ringing suppression time is started. In block 604, the zero crossing voltage (zvcs) is detected. Also a determination is made whether a count of the number of zero crossings (zvcs) is equal to a predetermined internal count. If the count is determined not to equal the internal count, a determination is made in block 606 whether a time period (TPERIOD) equals the maximum switching time, e.g. whether a number of pulses on line 320 to trigger counter 308. If the TPERIOD does not equal the maximum switching time, then block 604 is repeated.

If the TPERIOD equals the Maximum switching time or the number of Zero crossings equals the internal count, then the switching transistor or gate is turned on in block 608. Also in block 608 a feedback voltage on the output of the switching power supply is measured. In block 610, a determination is made whether the current senses or the power (PWM) Ramp equals the feedback voltage. If the Current sense does not equal the feedback voltage, in block 612, a determination is made whether the Total On time (TON), is greater than the Maximum on time, e.g. whether counter 306 was triggered. If the total on time is not greater than the maximum on time, block 608 is repeated. If the total on time is greater than the maximum on time, in block 614, the transistor switch is turned off.

In block 616, a determination is made whether the (zcvs) voltage level is higher or lower than the pre-determined voltage level.

In block 618, if the (zcvs) voltage level is lower than the pre-determined voltage level, a ringing suppression time is set to a first predetermined time period. In block 620, if the (zcvs) voltage level is higher than the pre-determined voltage level, a ringing suppression time is set to a second predetermined time period. The second predetermined time has a time period less than the first predetermined time period. In block 622, the maximum on time and switching time is reset. The process then repeats in block 606 where a determination is made whether the TPERIOD is equal to the maximum switching time.

The predetermined time periods may be determined by generating a digital input clock and feeding the digital input clock to different duration counters. The output pulse of one of the duration counters is selected when the (zcvs) voltage level exceeds a predetermined voltage threshold level and an output pulse of another duration counter is selected when the (zcvs) voltage level is below the predetermined voltage threshold level. The duration of the output pulses from the duration counties have a different predetermined time periods.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims.

The invention claimed is:

1. A system comprising:
a switching power supply operable to be fed a zero crossing voltage and to generate an output voltage, said output voltage having a voltage level set using a modulated gate signal;
a circuit to set a ringing suppression time of the modulated gate signal to a first time period when the zero crossing voltage is below a predetermined voltage threshold and to a second time period when the zero crossing voltage is above the predetermined voltage threshold, the ringing suppression time corresponding to an initial oscillation of the zero crossing voltage caused by the modulated gate signal switching the switching power supply; and
a pulse generation circuit that is operable to generate a pulse signal and feed to a counter a pulse train comprising generated pulse signals, wherein the ringing suppression time is operable of being set using an output of the counter or the pulse signal, wherein the output of the counter is selected as the ringing suppression time when input supply voltage falls to a level below the predetermined voltage threshold, and wherein a duration of the pulse generation circuit is selected as the ringing suppression time when the input supply voltage rises to a level above the predetermined voltage threshold, the input supply voltage being the zero crossing voltage.

2. A system as recited in claim 1, wherein the zero crossing voltage is generated from the output voltage, and wherein the predetermined voltage threshold is a preset reference voltage level.

3. A system as recited in claim 1, wherein the modulated gate signal has a maximum on time operable to be set by a predetermined number of clock cycles of the pulse generation circuit.

4. A system as recited in claim 3, wherein the predetermined number of clock cycles from the pulse generation circuit is a first predetermined number of pulses from the pulse generation circuit, wherein the modulated gate signal has a maximum switching time operable to be set by a second predetermined number of pulses from the pulse generation circuit, and wherein the second predetermined number is greater than the first predetermined number.

5. A system as recited in claim 1, wherein the pulse generation circuit comprises:
a current source circuit to generate a voltage,
a comparator,
a capacitor, and
a switch, wherein the current source circuit is operable to generate a current signal that is fed to a first input of the comparator and wherein the pulse generation circuit includes a reference voltage operable to be fed to a second input of the comparator, and wherein an output of the comparator generates a pulse that is fed to the switch in parallel with the capacitor to shunt a voltage level of the current signal to ground when the voltage level of the current signal rises to a level that exceeds the reference voltage.

6. In a system comprising a switch mode power supply, a device comprising:
a transistor switch; and
a drive circuit having an input receiving a primary current stimulation, the switched mode power supply operable to supply a first output power having a first level at a first time and a second output power having a second level at a second time, the first level being higher than the second level, said drive circuit operable to lower a switching frequency to reduce switching losses as an output load decreases,
wherein said drive circuit is operable during a lowering of the switching frequency upon an occurrence of the second output power, and during a switch-on interval of the transistor switch, to suppress a settling voltage for the primary current stimulation for a predetermined time period, the settling voltage corresponding to an initial oscillation of the primary current stimulation, the predetermined time period comprising a ringing suppression time, and wherein the switch-on interval is set at a periodic interval that reduces audio noise of the switched mode power supply, and
wherein the at least one transistor switch and drive circuit are provided an output supply voltage, wherein the ringing suppression time is operable to be set using a pulse generation circuit, the pulse generation circuit being operable to generate a pulse that is fed to a duration counter such that:
when the output supply voltage falls below a predetermined voltage threshold, an output of the duration counter is operable to be selected as the ringing suppression time, and
when the output supply voltage exceeds the predetermined voltage threshold, a period of the pulse is operable to be selected as the ringing suppression time.

7. A device as recited in claim 6, wherein the switching frequency is operable to be generated using a modulated gate signal that has a maximum on time operable to be set by a predetermined number of clock cycles of a digital input clock.

8. A device as recited in claim 7, wherein the modulated gate signal has a maximum switching time operable to be set by an additional predetermined number of clock cycles of the digital input clock, wherein the additional predetermined number is greater than the predetermined number.

9. A device as recited in claim 7, wherein the digital input clock comprises a current source circuit to generate a voltage, a comparator, and a capacitor coupled in parallel with a switch, wherein the current source circuit is operable to generate a current signal that is fed to a first input of the comparator, wherein the digital input clock comprises a reference voltage operable to be fed to a second input of the comparator, wherein the comparator is operable to generate a digital input clock signal and feed the digital input clock signal to the switch, and wherein the switch is operable to shunt the current signal to ground when a voltage level of the current signal from the current source circuit exceeds the reference voltage.

10. A device as recited in claim 7, wherein the modulated gate signal has a maximum switching period operable to be set by an additional predetermined number of clock cycles of the digital input clock.

11. A device as recited in claim 7, wherein the modulated gate signal has a maximum switching period operable to be set by an additional predetermined number of clock cycles of the digital input clock, wherein the additional predetermined number is greater than the predetermined number.

12. A device as recited in claim 7, wherein the pulse generation circuit includes a current source circuit to generate a voltage, a comparator, a capacitor, and a switch, wherein the current source circuit is operable to generate a current signal that is fed to a first input of a comparator and wherein the pulse generation circuit includes a reference voltage operable to be fed to a second input of the comparator, and wherein an output of the comparator generates a pulse that is fed to the switch in parallel with the capacitor to shunt the current signal to ground when the current source circuit exceeds the reference voltage.

13. A method for preventing audio noise, the method comprising:
providing a switched mode power supply comprising a transformer, at least one transistor switch, and a drive circuit having an input receiving a primary current stimulation, the switched mode power supply supplying via the transformer a first output power having a first level at a first time and a second output power having a second level at a second time, the first level being higher than the second level;
as an output load decreases, temporarily lowering a switching frequency of the transistor switch to reduce switching losses;
as the output load increases, temporarily raising the switching frequency; and
during a lowering of the switching frequency upon an occurrence of the second output power and during a switch-on interval of the transistor switch, reducing audio noise by suppressing a settling voltage for the primary current stimulation for a predetermined time period, the settling voltage corresponding to an initial oscillation of the primary current stimulation, wherein the predetermined time period is set using a predetermined number of digital pulses.

14. A method as recited in claim 13, wherein the switched mode power supply has an input supply voltage, and wherein the predetermined time period is set by generating the digital pulses with a pulse signal; and the method further comprising feeding the pulses to a duration counter such that an output of the duration counter is selected to set the predetermined time period when the input supply voltage exceeds a predetermined voltage threshold.

15. A method as recited in claim 14, further comprising generating a modulated gate signal, and setting a maximum on time of a pulse of the modulated gate signal with a predetermined number of pulses from a pulse generation circuit.

16. A method as recited in claim 15, wherein the predetermined number of pulses is a first predetermined number of pulses, and wherein the method further comprises setting a maximum switching time of the modulated gate signal with a second predetermined number of pulses of the pulse generation circuit, wherein the second predetermined number of pulses is greater than the first predetermined number of pulses.

17. A method as recited in claim 16, further comprising:
feeding a current source to a first input of a comparator;
feeding a reference voltage to a second input of the comparator to generate the digital pulses; and
feeding the digital pulses to a switch in parallel with the capacitor to shunt the current source to ground when a voltage level from the current source exceeds the reference voltage.

18. A method as recited in claim 13, wherein during the predetermined time period detection of a zero crossing is suppressed.

* * * * *